US009335405B2

(12) United States Patent
Durand et al.

(10) Patent No.: US 9,335,405 B2
(45) Date of Patent: May 10, 2016

(54) ENHANCED RF DETECTION SYSTEM

(71) Applicant: Rosemount Aerospace Inc., Burnsville, MN (US)

(72) Inventors: William Durand, Edina, MN (US); Joseph Pesik, Eagan, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 81 days.

(21) Appl. No.: 14/296,108

(22) Filed: Jun. 4, 2014

(65) Prior Publication Data

US 2015/0355318 A1    Dec. 10, 2015

(51) Int. Cl.
*G01S 13/93*    (2006.01)
*G01S 13/02*    (2006.01)
(Continued)

(52) U.S. Cl.
CPC ............. *G01S 13/02* (2013.01); *G01S 13/91* (2013.01); *G01S 13/931* (2013.01); *G01S 13/9303* (2013.01); *G01S 2013/916* (2013.01); *G01S 2013/9335* (2013.01)

(58) Field of Classification Search
CPC ......... G01S 13/02; G01S 13/88; G01S 13/93; G01S 13/931; G01S 2013/9335; G01S 7/02; G01S 7/40; G01S 7/03; G01S 7/032; G01S 7/023; G01S 7/4052; G01S 7/4056; G01S 7/48; G01S 7/497; G01S 13/9303; G01S 13/91; G01S 13/913; G01S 2013/916; H01Q 1/27; H01Q 1/32; H01Q 1/3208; H01Q 1/3233
USPC ................. 342/27–51, 70–72, 165–175, 195, 342/5–11, 118; 343/700 R, 705, 708–712
See application file for complete search history.

(56) References Cited

U.S. PATENT DOCUMENTS 4,319,247 A * 3/1982 Warren ................... G01S 7/40
342/171
5,432,516 A * 7/1995 Cherry ................ G01S 7/4056
342/170
(Continued)

FOREIGN PATENT DOCUMENTS

EP    0336027 A1 * 10/1989    ............. G01S 7/497
EP    2669706 A2    12/2013
(Continued)

OTHER PUBLICATIONS

Extended European Search Report; EP Application No. 15169582.2-1812; Date of Mailing: Oct. 20, 2015; 6 pages.

*Primary Examiner* — Bernarr Gregory
(74) *Attorney, Agent, or Firm* — Cantor Colburn LLP

(57) ABSTRACT

A radio frequency (RF) obstacle detection system of a vehicle includes an RF radar module that transmits an initial RF signal having a first signal strength and to receive at least one reflected RF signal having a second signal strength based on the initial RF signal. A radar reflector module is coupled to the vehicle and disposed at a first distance remotely located from the RF radar module. The radar reflector module receives the RF signal generated by the RF radar module and efficiently retroreflects the RF signal to generate a reflected signal having a second signal strength back to the RF radar module. A control module determines a second distance between the radar reflector module and at least one obstacle remotely located from the vehicle based on the reflected signal provided by the radar reflector module and a received signal induced by the at least one obstacle.

15 Claims, 3 Drawing Sheets

(51) Int. Cl.
*G01S 13/91* (2006.01)
*G01S 13/00* (2006.01)

(56) References Cited

U.S. PATENT DOCUMENTS

| | | | |
|---|---|---|---|
| 5,896,103 A | 4/1999 | Bunch | |
| 6,005,511 A * | 12/1999 | Young | G01S 7/02 |
| | | | 342/5 |
| 6,014,108 A * | 1/2000 | Lynch | H01Q 1/3233 |
| | | | 342/175 |
| 6,057,797 A * | 5/2000 | Wagner | G01S 7/032 |
| | | | 342/27 |
| 6,118,401 A | 9/2000 | Tognazzini | |
| 6,127,964 A * | 10/2000 | Kageyama | G01S 13/931 |
| | | | 342/70 |
| 6,392,586 B1 * | 5/2002 | Thordarson | G01S 13/931 |
| | | | 342/169 |
| 6,404,383 B1 | 6/2002 | Knezek et al. | |
| 6,466,157 B1 * | 10/2002 | Bjornholt | G01S 7/032 |
| | | | 342/28 |
| 6,778,131 B2 * | 8/2004 | Haney | G01S 13/931 |
| | | | 342/165 |
| 6,894,641 B2 * | 5/2005 | Uehara | G01S 7/023 |
| | | | 342/175 |
| 7,486,226 B2 * | 2/2009 | Edvardsson | G01S 13/88 |
| | | | 342/175 |
| 7,525,476 B1 | 4/2009 | Delin et al. | |
| 7,903,023 B2 * | 3/2011 | Cornic | G01S 13/9303 |
| | | | 342/118 |
| 2009/0282892 A1 | 11/2009 | Sai | |
| 2014/0142838 A1 | 5/2014 | Durand | |

FOREIGN PATENT DOCUMENTS

| | | | |
|---|---|---|---|
| EP | 2733561 A2 | 5/2014 | |
| GB | 2083966 A * | 3/1982 | G01S 7/4056 |
| WO | 2013181314 A1 | 12/2013 | |

* cited by examiner

ENHANCED RF DETECTION SYSTEM

TECHNICAL FIELD

The present disclosure relates to an aircraft-on-ground obstacle detection system, and more particularly, to an enhanced radio frequency (RF) obstacle detection system.

BACKGROUND

Conventional ground vehicle obstacle detection systems typically utilize low-power sensor units to detect obstacles located in the field of view of the sensor. Low power may be defined as below regulatory thresholds for unlicensed emitters. The dimensions of larger vehicles such as aircraft, for example, may make it difficult for pilot and crew members to judge the clearance of the taxiing aircraft with respect to obstacles on the ground. For example, in larger-body aircraft, the wings may not be visible to the pilot or co-pilot. Therefore, it may be difficult to ascertain distances between obstacles and the aircraft's wings. In addition, the accuracy and overall performance of conventional RF modules may decrease as debris or ice covers the sensor unit and/or the radar is operated in degraded atmospheric conditions.

SUMMARY

According to an embodiment, a radio frequency (RF) obstacle detection system of a vehicle includes an RF radar module that transmits an initial RF signal having a first signal strength and to receive at least one reflected RF signal having a second signal strength based on the initial RF signal. A radar reflector module is coupled to the vehicle and disposed at a first distance remotely located from the RF radar module. The radar reflector module receives the RF signal generated by the RF radar module and efficiently retroreflects the RF signal to generate a reflected signal having a second signal strength back to the RF radar module. A control module determines a second distance between the radar reflector module and at least one obstacle remotely located from the vehicle based on the reflected signal provided by the radar reflector module and a received signal induced by the at least one obstacle.

According to another embodiment, a method of detecting an obstacle with respect to a vehicle comprises transmitting via an RF radar module an initial RF signal having a first signal strength. The method further includes receiving via the RF radar module at least one retroreflected RF signal having a second signal strength based on the initial RF signal. The method further includes determining a second distance between the radar reflector module and at least one obstacle remotely located from the vehicle based on the second reflected signal and a third signal induced by the at least one obstacle.

BRIEF DESCRIPTION OF THE DRAWINGS

The subject matter which is regarded as the invention is particularly pointed out and distinctly claimed in the claims section at the conclusion of the specification. The foregoing and other features, and advantages of the invention are apparent from the following detailed description taken in conjunction with the accompanying drawings in which:

DETAILED DESCRIPTION

Figure 1:
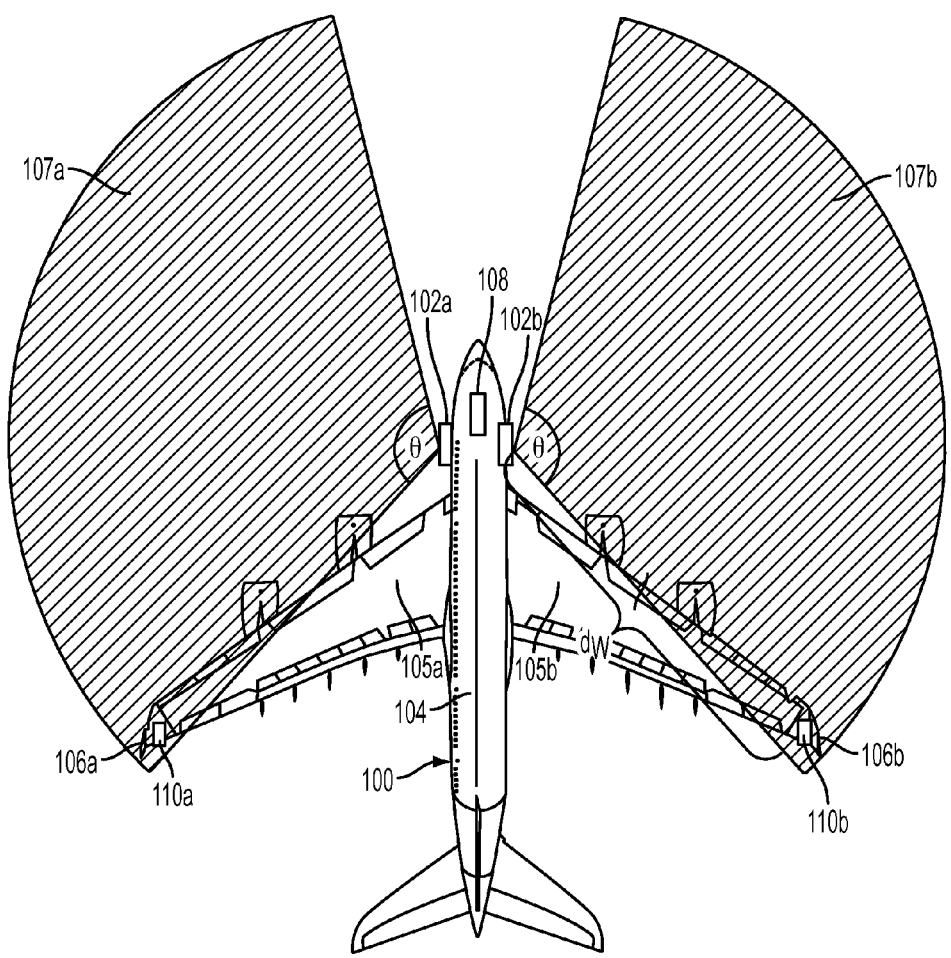
FIG. 1 illustrates an aircraft including an RF obstacle detection system (ODS) according to an embodiment of the present disclosure.

Large vehicles may be susceptible to areas (i.e., blind spots) around the vehicle that are difficult to ascertain or cannot be directly observed by the driver while at the controls. On large airplanes, for example, (such as the Boeing 747, 767, and 777; the Airbus A380; and the McDonnell Douglas MD-10 and MD-11), the pilot cannot visually ascertain positions of the airplane's wingtips from the cockpit with accuracy. One approach to avoiding such a problem is to include a ground collision avoidance system (GCAS). However, in some cases obstacles that are collision threats may go undetected by the GCAS. Also, if a GCAS provides too many false alarms ("false positives") when evaluating the threat of collision with an obstacle, the crew may begin to ignore or disable the system.

Embodiments disclosed herein provide an RF obstacle detection system (ODS) that includes a radio frequency (RF) radar module disposed on a body of a vehicle, e.g., fuselage, landing gear struts, tail section, radomes, etc., and a radar reflector module disposed at a distance remotely located from the RF radar module. According to an embodiment, the RF radar module is disposed on the body of an aircraft and the radar reflector module is disposed on the wingtip. Multiple radar reflector modules placed in the radar field of view enable a differential range measurement, which can further enhance radar measurement accuracy. The RF radar module is configured to transmit an initial RF signal and receive a reflected RF signal from one or more obstacles, for example. The radar reflector module is ideally configured to act similar to a retroreflector, by returning the initial RF signal to the RF radar module along the direction from which it was received. A control module is configured to more precisely determine a wingtip distance between the radar reflector module and the RF radar module, determine a location of the wingtip based on the wingtip distance, and can detect a threat of collision between the wingtip and an obstacle based on the relative locations of the object and the wingtip. The control module may also determine an attenuation coefficient of the propagated signal and may control the power of the RF radar module based on the attenuation coefficient. In this manner, the range performance of the radar unit may be maintained as signal power from the radar reflector module changes.

The radar reflector module functions to return the initial RF signal energy incident upon it back to the RF radar module with minimal loss. This function can be performed by a retroreflector, for example, or other similar devices. A retroreflector is a device or surface that reflects an electromagnetic wave front back along a vector parallel to but opposite in direction from the wave's source, with a minimum of scattering or other loss. The angle of incidence at which the device or surface reflects light in this way is greater than zero, unlike a planar mirror, which does this only if the mirror is exactly perpendicular to the wave front. Behaving in this manner, the radar reflector module returns more of the RF signal incident upon it than will the background features within the radar module instantaneous field of view. In effect, it behaves as if it has a large radar cross section (RCS). This is analogous to retroreflecting materials employed in visual safety markers and tapes. When illuminated, they return much of the incident light, making them highly detectable against their surroundings. The enhanced detectability of the radar reflector module results in a highly differentiable signal returned to the RF radar module, allowing accurate determination of the radar reflector module position.

Devices or surfaces that behave as RF retroreflectors may be constructed in various ways and can be passive or active in operation. Passive corner reflectors perform well, but are not aerodynamic when sized for RF wavelengths. Another implementation incorporates planar-type tuned passive electromagnetic reflectors such as split ring resonators (SRR) and pancake resonators. These devices can be constructed as thin planar patches, with low aerodynamic drag and good environmental robustness. Such devices can also be made to operate actively, by employing a power source to energize the structure or circuit when illuminated by an RF source. External power can also be used to provide surface heating to avoid ice buildup and resulting signal degradation. Additionally, external power can be supplied to internal RFID devices that can return useful data with reflected RF signals. Alternatively, these RFID devices can be energized by incident RF radiation from the RF radar module. These patch constructs do not function as ideal retroreflectors, but do reflect substantially more incident RF energy than background features, as required by the present invention to accurately determine radar reflector module position.

Turning now to FIG. 1, an aircraft 100 including an RF ODS is illustrated according to an embodiment. One or more RF radar modules 102a and 102b are mounted on the body 104 of the aircraft 100. The wings 105a/105b of the aircraft 100 extend between a first end coupled to the body 104 and a respective wingtip 106a/106b. Various aircrafts also include a winglet that extends vertically from a respective wingtip 106a/106b to reduce the drag force realized by the aircraft 100 during flight as understood by one of ordinary skill in the art.

The RF radar modules 102a/102b described herein may be low power, high performance radio frequency devices and may include transducers for obtaining radar signals. The RF radar modules 102a/102b may also include multiple radar technologies. For instance, Ultra Wideband (UWB) radars may be integrated with Frequency Modulated Continuous Wave (FMCW) units to improve obstacle detection performance at both short and long ranges. In one embodiment, a monostatic radar configuration uses the same antennas for transmitting and receiving signal energy. In another embodiment, a multistatic configuration may use multiple antennas to characterize obstacle geometries. Both configurations may be employed in a single system.

The RF radar modules 102a/102b may transmit an initial RF signal at a first time period to define a respective field-of-view 107a/107b capable of indicating the volume of space in front of the wingtip 106a/106b. The initial RF signal has a beam width suitable for detecting obstacle collision threats of various radar cross section (RCS) signatures. According to an embodiment, the initial RF signal may be continuously swept to define a respective field-of-view 107a/107b extending at angle ($\theta$) with respect to the RF radar module 102a/102b. The angle may be, for example, approximately 140 degrees with respect to the RF radar module 102a/102b, and the signal may extend, for example, approximately 150 meters forward of the aircraft's wingtips 106a/106b, allowing for obstacle detection and safe response by the flight crew at typical taxi speeds. The initial RF signal may be steered electronically or mechanically to achieve various sweep angles as understood by one of ordinary skill in the art. In this manner, the field-of-view 107a/107b may indicate a volume of space in front of the aircraft wingtips 106a/106b. The field-of-view 107a/107b, however, is not limited to 140 degrees and may be widened to include a forward view along the body 104 to detect obstacles in the taxi direction as well or narrowed to concentrate on potential obstacles in closer proximity to the aircraft wingtips 106a/106b. For example, angularly swept field-of-view up to 360 degrees sweep coverage with respect to the RF radar module 102a/102b. If an obstacle is present within the radar field-of-view 107a/107b, the reflection of the transmitted signal from the obstacle is received by the RF radar modules 102a/102b at a second time period (i.e., at a later time period).

According to an embodiment, a control module 108 included in the aircraft 100 may adjust emitted power levels to remain below regulatory limits as the radar beam is swept across the field of view, compensating for geometrical antenna gain effects. Accordingly, emitted power strength may be compensated with respect to geometry/antenna gain.

Similarly, a resonator and/or RFID module can be attached to obstacles in fixed locations, providing enhanced detectability and other useful data including accurate obstacle position, height, fixed object type, etc. According to another embodiment, the RF radar modules 102a/102b are configured to receive an RF identification (RFID) signal that provides additional information regarding one or more obstacles near the aircraft 100. For example, an RFID module may be disposed remotely from the aircraft 100 such as, for example, at fixed objects located near aircraft taxiing areas, or moveable objects such as aircraft tow carts, baggage carts and/or other aircraft. The initial RF signal generated by the RF radar module 102a/102b may be received by the RFID module. In response to the initial RF signal, the RFID module may be energized and may generate the RFID signal which is received by the RF radar module 102a/102b.

The control module 108 may be programmed to determine that an RFID module is configured to communicate with the RF radar module 102a/102b at a predetermined safe taxi distance such as, for example, 10 meters (m). Also, when an RFID signal is received, the control module 108 may resolve that an object exists near the aircraft 100 with ranging accuracies approaching 1 m.

The RFID signal may also be a digital signal that provides additional information about the object supporting the RFID module. According to an embodiment, the RFID module may provide longitude and latitude data indicating the location of the object supporting the RFID module. In this manner, the exact location of the object may be ascertained. The RFID module may also provide GPS time mark messages when transmitting, so range can be accurately determined by the control module 108 through elapsed time, similar to GPS satellite ranging. According to another embodiment, the RFID signal may provide information about a nearby aircraft supporting the RFID module. The information may include the type of aircraft and the wingspan of the aircraft.

Conventional aircraft obstacle detection systems typically utilize low-power sensor units to detect obstacles located in the field of view of the sensor. Low power may be defined as below regulatory thresholds for unlicensed emitters. Consequently, conventional aircraft obstacle detection systems are incapable of determining precise distances between the vehicle and the object providing the reflected signal.

In embodiments disclosed herein, an RF ODS is provided that includes not only an RF radar module 102a/102b that transmits and receives an RF signal, but also one or more radar reflector modules 110a/110b. Each radar reflector module 110/110b is configured to receive the initial RF signal and efficiently retroreflect the signal back to the RF radar module. 102a/102b. The radar reflector modules 110a/110b are coupled to the aircraft 100 and disposed at a distance remotely located from the RF radar module 102a/102b. For example, each radar reflector module 110a/110b is coupled to a respective wingtip 106a/106b. According to another embodiment, the radar reflector module 110a/110b is disposed within a winglet extending from a respective wingtip 106a/106b. In this manner, a wingtip distance $d_w$ is precisely defined between an RF radar module 102a/102b and a respective radar reflector module 110a/110b. Distance dw, determined by the RF radar module 102a/102b, can be calibrated against a physical measurement of this distance.

The control module 108 may be programmed with the distance at which the radar reflector module 110a/110b is located from the RF radar module 102a/102b. Accordingly, the control module 108 can determine the total roundtrip distance which the initial RF and radar reflector module reflected signal travel, a distance equal to approximately $2 d_w$. As the initial RF and radar reflector module reflected signal travels along dw, signal strength decreases due to and proportional to the level of attenuation of the surrounding environment. The rate at which the signal strength decreases is referred to as the attenuation coefficient or extinction coefficient by those ordinarily skilled in the art. The control module 108 may determine the attenuation coefficient based on the present signal strength of the radar reflector module reflected signal and distance $d_w$. In this manner, at least one embodiment provides a feedback loop where the control module 108 generates a control signal that commands the RF radar module 102a/102b to adjust the power of the initial RF signal such that attenuation may be counteracted. The attenuation coefficient may be determined, for example, according to the following equation:

$$I = I_0 e^{-\alpha x}, \tag{1}$$

where I is the measured intensity, $I_0$ is the incident intensity, $\alpha$ is the attenuation coefficient, and x is path length in a single direction, e.g., $d_w$. In this manner, the accuracy of the radar unit may be maintained as the environmental conditions surrounding the aircraft 100 degrade.

According to another embodiment, the radar reflector module 110a/110b is configured as corner reflectors of an appropriate dimension relative to wavelength. In another embodiment, the radar reflector module 110a/110b is formed as a stand-alone RFID device that is energized by incident RF radiation and emits a periodic message with a time tag that enables range determination.

According to an embodiment, the RF radar modules 102a/102b may be capable of detecting obstacles greater than approximately 4 centimeters (i.e., approximately 1.5 inches) in size. In addition, the accurate measurements of relatively small distance such as, for example, approximately 1-2 meters, may be determined at distances beyond approximately 50 meters (i.e., approximately 165 feet, in excess of wing length for most aircraft). Obstacles of particular collision risk in airport taxi environments include: airfield fence posts/poles; airfield lighting; taxiway markings; housing structures; other aircraft; ground vehicles; and ground personnel to name but a few.

Figure 2:
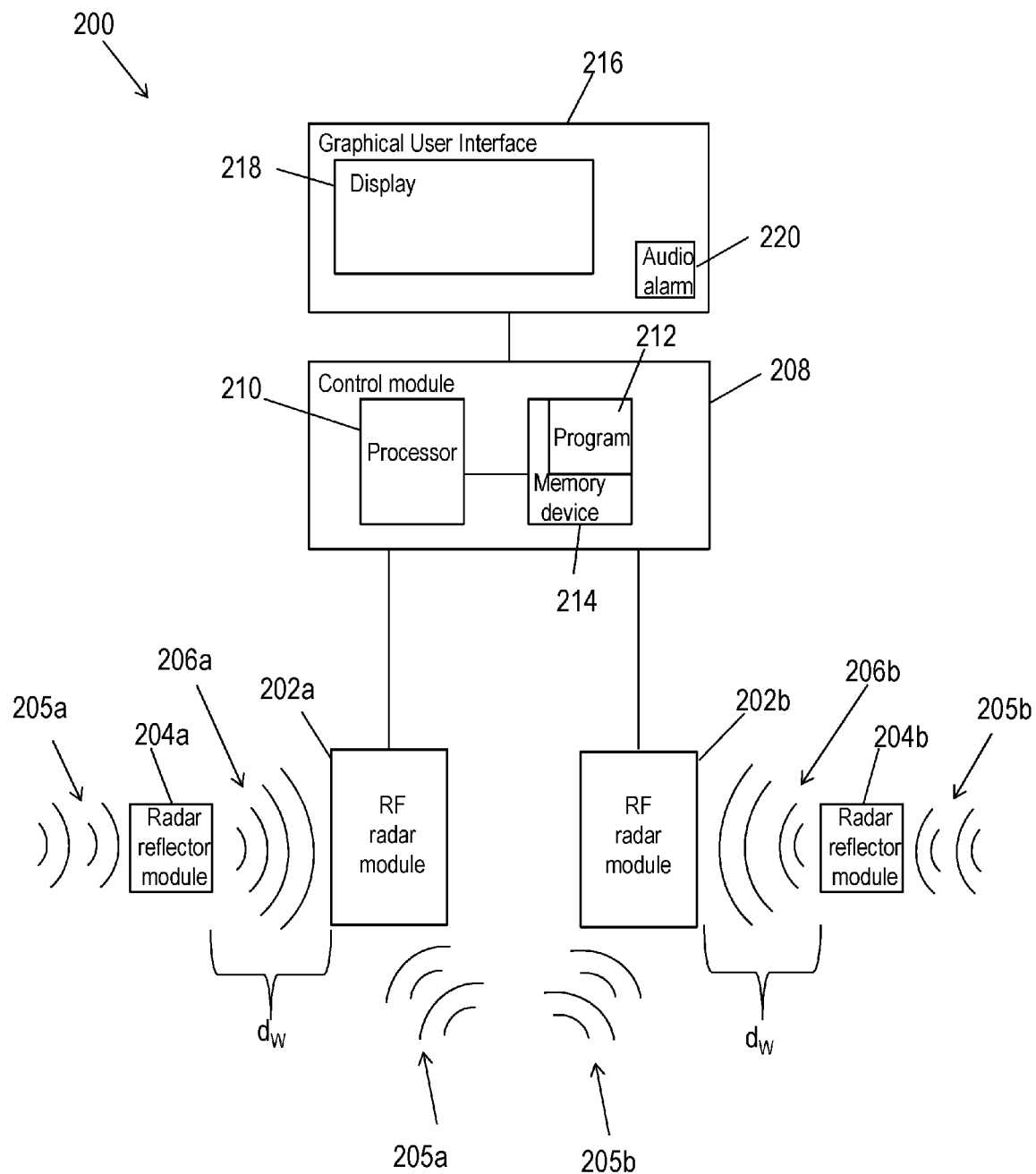
FIG. 2 is a block diagram of an RF ODS according to an embodiment.

Referring to FIG. 2, a block diagram of an RF ODS 200 is illustrated according to an embodiment. The RF ODS 200 includes one or more RF radar modules 202a/202b, one or more radar reflector modules 204a/204b, and a control module 208. The RF radar modules 202a/202b may communicate with the control module 208 either wirelessly or via a wired connection. The control module 208 receives information regarding obstacle ranges and positions and/or information regarding signal strength of the initial RF signal and one or more received signals.

The RF radar modules 202a/202b are configured to transmit an initial RF signal having a first signal strength and to receive one or more reflected signals having different signal strengths, for example. The transmitted initial RF signals may have a frequency of, for example, 24 GHz or 77 GHz. The received signals may include one or more signals 206a/206b reflected from radar reflector modules 204a/204b mounted on the host aircraft and other signals 205a/202b reflected from objects within the radar field of view. These objects may include signals induced (i.e., reflected) by potential obstacles (i.e. airfield fence posts/poles, airfield lighting, taxiway markings, housing structures, other aircraft, ground vehicles, and ground personnel) located in the field of view of the RF ODS 200, as well as signals generated by radar reflector modules, RFID modules, or modules with combined radar reflector and RFID functionality placed on objects in the environment of the host aircraft to facilitate ease of object detection and identification.

The radar reflector modules 204a/204b are disposed a predetermined distance away from the RF radar modules 202a/202b. According to an embodiment, each radar reflector module 204a/204b is disposed on a respective wingtip of an aircraft and the RF radar modules 202a/202b are disposed on the body of the aircraft. Accordingly, the distance between the radar reflector modules 204a/204b and the RF radar modules 202a/202b indicate a wingtip distance ($d_w$) between a wingtip and the aircraft body.

When an initial RF signal transmission with a first signal strength is produced by a respective RF radar module 202a/202b, the radar reflector module 204a/204b receives it and efficiently retroreflects the signal 206a/206b having a second signal strength back to the RF radar module 202a/202b. Thus, the radar reflector module 204a/204b propagates reflected signals 206a/206b having increased signal strength with respect to the received RF signals 205a/205b, having a third signal strength, for example. In this manner, the control module 208 may distinguish between received signals 205a/205b and radar reflector module reflected signals 206a/206b. The RF radar module 202a/202b can also differentiate radar reflector module reflected signals from received signals 205a/205b based upon the known locations (dw) of the radar reflector module 204a/204b.

The radar reflector modules 204a/204b may be constructed in various manners. According to an embodiment, the radar reflector modules are constructed as planar-type tuned passive electromagnetic reflectors including, but not limited to, split ring resonators (SRR) and pancake resonators. Each radar reflector module 204a/204b may be tuned to generate a desired radar cross section (RCS). A housing supporting the resonator modules 204a/204b may be formed from, for example, a multilayer structure with the planar resonant circuit located between two protective material layers. The protective materials must withstand exposure to aircraft environments in flight and on the ground while protecting the circuit from degradation. The environmentally exposed material surface must be RF transparent to allow incident RF energy to interact with the resonant circuit and for the circuit to reflect energy back to the source. It should also be hydrophobic in nature, thereby minimizing water and ice buildup which would degrade RF performance. One such material is Polytetrafluoroethylene (PTFE), commonly known as Teflon. There are other suitable choices. The resulting "patch" is relatively thin with low aerodynamic drag and weight. As such, it can be adhesively bonded to surfaces with little effect. The patch can be heated for anti-icing by addition of a heating layer or film between the resonant circuit and bonded surface. In this way, RF properties are unaffected. Heating power can be supplied by sources external to the patch. An RFID capability can also be added to the patch so the device is energized by incident RF radiation and periodically transmits digital messages with desired information (e.g., location, bonded object height, etc.).

The control module 208 includes an electronic microprocessor 210 and a memory device 214 and is configured to calibrate the RF radar modules 202a/202b with respect to non-attenuated RF transmissions between the RF radar modules 202a/202b and the radar reflector modules 204a/204b. The calibration may include determining the distance between the RF radar modules 202a/202b and the radar reflector modules 204a/204b and/or the nominal attenuation coefficient as described in greater detail below. The memory device 214 may be a non-transitory memory device, such as a RAM or ROM device or other suitable memory device. The memory device 214 may be suitable for storing various data that may be used in the RF ODS 200 as well as various data that is obtained from the RF radar modules 202a/202b or from calculations performed at microprocessor 210. In addition, the memory device 214 may include one or more programs 212 or set(s) of instructions that are accessible to the microprocessor 210. When accessed by the microprocessor 210, the one or more programs 212 enable the microprocessor 210 to perform the methods disclosed herein for avoiding collision with an obstacle while on the ground.

The microprocessor 210 performs various calculations in order to determine a present location, and/or distance of one or more obstacles relative to the host aircraft, and to perform a decision-making algorithm to determine a likelihood of collision with the obstacle. In one embodiment, the microprocessor 210 may match radar signals to obstacle characteristic templates through a correlation process in order to identify an obstacle presence, type, shape, etc. The processor may apply adaptive noise filters which characterize noise energy and attenuate the noise energy accordingly, and then normalize a noise floor in order to establish an effective obstacle detection threshold. The microprocessor 210 may further employ threshold filters which identify radar return signals sufficiently above the noise floor and report these signals as representing obstacles that are potential collision threats. Multiple radar signals or scans may be stacked in order to enhance a signal-to-noise ratio of the obstacle. The potential collision threat may be mapped to a range and azimuth location around the aircraft and to their motion relative to the aircraft.

The microprocessor 210 may also group radar signals meeting predetermined obstacle criteria and enter them as "obstacles" into tracking files. Each tracking file can be repeatedly tested for temporal persistence, intensity, rate of change of intensity and trajectory to help differentiate obstacles that are collision threats, other obstacles, false alarms or background clutter. Once a persistent obstacle collision track has been established, the processor determines distance to the aircraft and issues an appropriate alarm or warning signal. If the tracks persist and grow as range decreases, the processor performs a decision-making algorithm to declare the tracks a probable collision and issues an audible alarm and/or visual warning.

As described above, the microprocessor 210 is configured to determine a wingtip distance ($d_w$) between a radar reflector module 204a/204b and a respective RF radar module 202a/202b. In this manner, the microprocessor 210 may determine a location of the wingtip with respect to the body of the aircraft based on $d_w$. The microprocessor 210 is also configured to determine the distance and/or location of one or more obstacles with respect to the aircraft based on signals that are received by the RF radar modules 202a/202b. Accordingly, the microprocessor 210 may compare the location of the detected obstacles with the location of the wingtip to determine a precise distance between one or more obstacles and the wingtip. In this manner, the microcontroller 210 can detect a threat of collision between the wingtip and an obstacle. For example, microcontroller 210 generates an alert control signal to the graphical user interface (GUI) 216 when a distance between the wingtip and at least one obstacle is below a threshold distance. In response to receiving the alert control signal, the GUI generates one or more alerts indicating a threat of collision between the wingtip and an obstacle as described in greater detail below.

The microprocessor 210 may determine an equivalent radar cross section (RCS) associated with the radar reflector modules 204a/204b based on the distance between the RF radar modules 202a/202b and the radar reflector modules 204a/204b (e.g., $d_w$), a reflected field strength at the RF radar modules 202a/202b, and the strength of the incident field at the radar reflector modules 204a/204b. According to an embodiment, the RCS may be based on the following equation:

$$\sigma = \frac{\text{power reflected toward source/unit solid angle}}{\text{incident power density}/4\pi} = \lim_{R \to \infty} 4\pi R^2 \left| \frac{E_r}{E_i} \right|^2 \quad (2)$$

The microprocessor 210 determines an attenuation coefficient of the signal propagation path. Based on the attenuation coefficient, the microprocessor 210 may also determine the propagation effects of the radar reflector module reflected signal 206a/206b, and may control the power of an RF radar module 202a/202b based on the attenuation coefficient and/or the propagation effects. Under ideal environmental conditions, the microprocessor 210 may determine a nominal attenuation coefficient of the signal propagation path. If, however, the radar reflector module reflected signal 206a/206b begins to vary due to, for example, a degradation of environmental conditions such as snow, ice, dust, etc., the microcontroller 210 may generate a control signal that commands the respective RF radar module 202a/202b to increase the power level, i.e., signal strength, of the transmitted initial RF signal, by an amount that is directly proportional to the level of attenuation, so as to maintain an overall consistent transmit signal strength on the potential obstacles in the field of view, while remaining in full regulatory compliance. In this manner, attenuation of the initial RF transmit signals may be counteracted.

This same technique can be applied relative to radar sweep angle (e) to maintain overall consistent transmit signal strength on potential obstacles in the field of view. Electronically steered antennas, for example, have signal responses (commonly called gain) which vary significantly according to sweep angle. Dynamic adjustment of power can maintain regulatory compliant transmit signal strength independent of sweep angle and any atmospheric attenuation that may be present. The microprocessor can also compensate for changing reflected signal strengths from the radar reflector module 204a/204b and obstacles as antenna gain varies with sweep angle. In this way, consistent relative signal strengths can be maintained within available dynamic range.

The microprocessor 210 therefore executes various data fusion algorithms, processes obstacle information, together with critical aircraft dynamics such as groundspeed, heading, and aircraft position to compute obstacle closing velocity and predict if a collision is probable.

The RF ODS 200 may further include a graphical user interface (GUI) 216 configured to receive various inputs and display various outputs and/or alerts. For example, if a collision is predicted, the control module 208 sends a signal to the GUI 216. The GUI 216 may then alert the one or members of the flight crew to the potential collision. The alert may include, but is not limited to, a sound, a voice command, an icon and/or a vibration, for example.

Various data may be sent to the GUI 216 which may be an interface in a cockpit of the aircraft or which is otherwise accessible to the crew of the aircraft. The various data may then be presented at the GUI 216 to the crew in order to inform the crew of any obstacles that may be within a vicinity of the aircraft and capable of causing mechanical or structural damage to the aircraft.

In one embodiment, the GUI 216 may include a screen or display 218 for providing a visual image to the crew. The visual image may include a representative image of an obstacle in relation to a part of the aircraft such as a wingtip. The display 218 may also show other data relevant to a distance between the aircraft and the obstacle and/or to an action for avoiding or preventing a collision. The GUI 216 may further include an audio alarm 220 that may provide an audible signal in order to alert the crew to the possibility of colliding with an obstacle. Additionally, a visual cue such as a flashing light at the display 218 may be used to alert the crew of the possibility of collision. The GUI 216 may provide system health information and indicate the operational status of the system. The GUI 216 may also provide a means for the fight crew to disable the system. In one embodiment, the GUI 216 is mounted in the cockpit, in the field of view of both the pilot and the first officer.

In operation, the RF ODS 200 disclosed herein may function as follows: while taxiing, the flight crew identifies an obstacle approaching but cannot visually determine if it will clear the aircraft (frequently the wingtip) or alternately, the crew may not identify an obstacle due to decreased visibility conditions or high workload situation; the pilot slows the aircraft while approaching the obstacle and monitors the GUI 216 mounted in the cockpit; the RF ODS 200 continually monitors distance to the obstacle; if the RF ODS 200 predicts the aircraft will collide with the obstacle, it issues an alert and the pilot stops the aircraft or implements other evasive action preventing the collision; if stopped, the pilot determines the appropriate maneuver before continuing to taxi the aircraft; and if the RF ODS 200 predicts the aircraft will not collide with the obstacle, then no alert is issued and the crew continues taxiing. As a further aid in crew visualization, a moving airport map can be provided on a display device. Obstacles can be indicated on the map along with potential collision threat locations and ranges. Own platform position can be dynamically displayed relative to these obstacles, providing a visual indication of status, response options and criticality.

Figure 3:
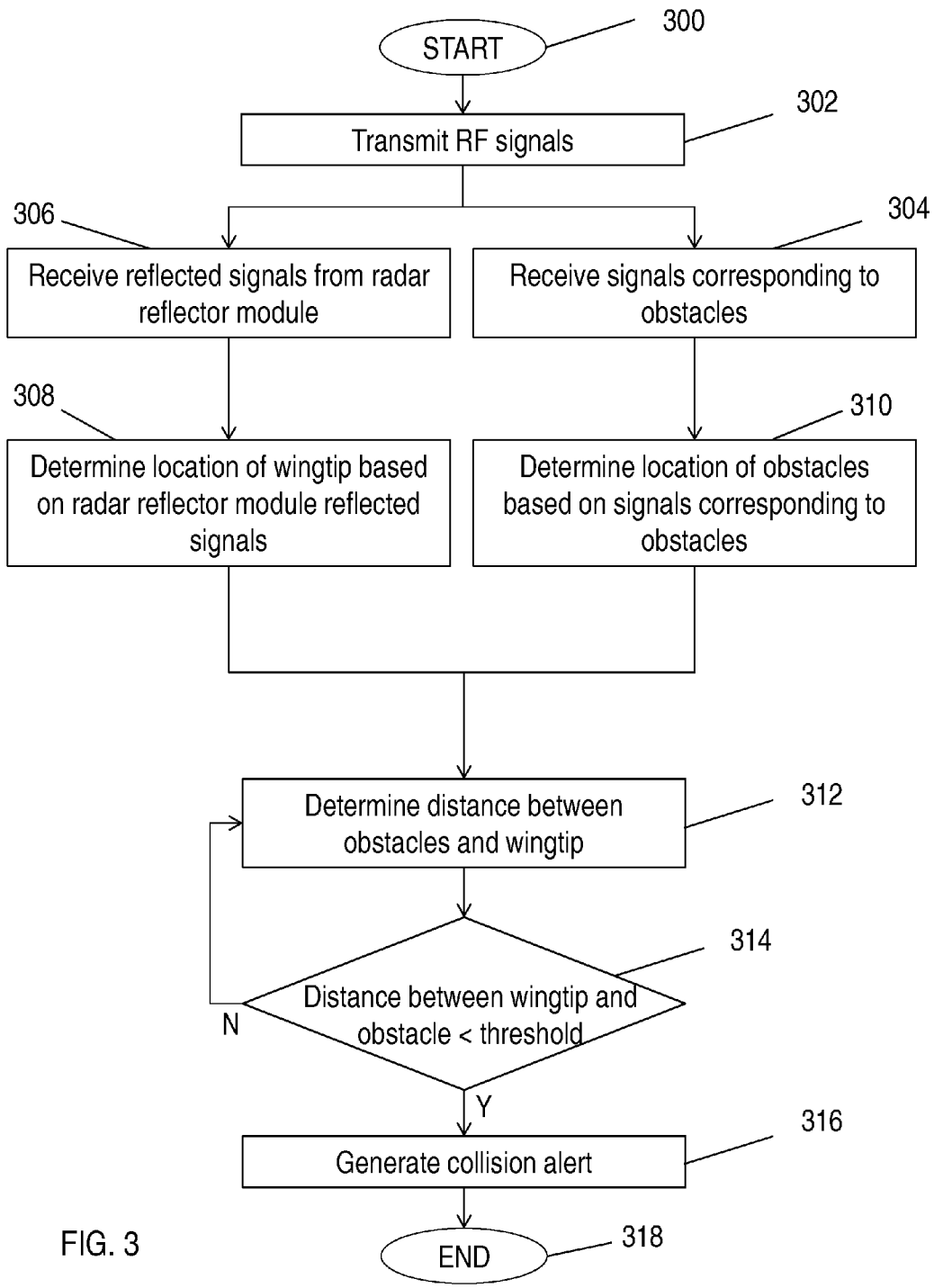
FIG. 3 is a flow diagram illustrating a method of detecting an obstacle with respect to a vehicle according to an embodiment.

Turning now to FIG. 3, a flow diagram illustrates a method of detecting an obstacle with respect to a vehicle according to an embodiment. The method begins at initial operation 300 and proceeds to operation 302 where an initial RF signal is transmitted. The RF signal is transmitted, for example, from an RF radar module disposed on a body of an aircraft. At operation 304, one or more signals are received by the RF radar module. The signals may be reflected from one or more respective obstacles (i.e. airfield fence posts/poles, airfield lighting, taxiway markings, housing structures, other aircraft, ground vehicles, or ground personnel) located near the aircraft. At operation 306, a radar reflector module reflected signal is received by the RF radar module. The radar reflector module reflected signal is generated by a radar reflector module disposed, for example, on a wingtip of the aircraft. The radar reflector module reflected signal strength is typically greater than the signal strength of the received signals, e.g., obstacle reflected signals. In this manner, the radar reflector module reflected signal may be distinguished from one or more other received signals. At operation 308, a location of the wingtip is determined based on the radar reflector module reflected signal. At operation 310, a location of one or more obstacles, for example, is determined based on a respective received signal.

Turning to operation 312, a distance between the obstacle and the wingtip is determined. At operation 314, the distance is compared to a threshold value. The threshold value may be, for example, an acceptable distance between the obstacle and the wingtip before a threat of collision between the wingtip and the obstacle exists. If the distance remains above the threshold value (i.e., the obstacles remain an acceptable distance away from the wingtip), the method returns to operation 312 and continues to determine the distance between the obstacle and the wingtip. If, however, the distance falls below the threshold value (i.e., the obstacle becomes critically near the wingtip), a collision alert is generated at operation 316 and persists until the impending collision condition is alleviated or the RF ODS 200 is shut down, and the method ends at operation 318. Under conditions where obstacles are further from the radar than the distance to the radar reflector module (dw), the order of signal reception changes. The radar reflector module reflected signal 306 is received first, followed by the received signal 304. This condition is of interest, for example, in sweeping transmissions forward of the aircraft during taxi to detect and track potential collision threats as the aircraft approaches them. Here, the radar reflector module calibrates the radar for wingtip distance (dw), supporting more accurate range measurements during transmission sweeps and dynamically adjusting radar power to compensate for atmospheric losses.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A radio frequency (RF) obstacle detection system of a vehicle, the system comprising:
an RF radar module coupled to the vehicle and configured to transmit an initial RF signal having a first signal strength and to receive at least one reflected RF signal having a second signal strength based on the initial RF signal;
a radar reflector module coupled to the vehicle and disposed at a first distance remotely located from the RF radar module, the radar reflector module configured to receive the RF signal generated by the RF radar module and efficiently retroreflect the RF signal to generate a reflected signal having a second signal strength back to the RF radar module; and a control module coupled to the vehicle and configured to determine a second distance between the radar reflector module and at least one obstacle remotely located from the vehicle based on the reflected signal provided by the radar reflector module and a received signal induced by the at least one obstacle.

2. The system of claim 1, wherein the vehicle is an aircraft including a body and at least one wing, the at least one wing extending between a first end coupled to the body and a wingtip located opposite the first end, wherein the RF radar module is coupled to the body and the radar reflector module is coupled to the wingtip to define the first distance.

3. The system of claim 2, wherein the control module determines a first location of the radar reflector module based on the reflected signal provided by the radar reflector module and a second location of the at least one obstacle based on the received signal, and determines the second distance based on a comparison between the first location and the second location.

4. The system of claim 3, wherein the transmitted initial RF signal defines an angularly swept field-of-view up to 360 degrees sweep coverage with respect to the RF radar module.

5. The system of claim 4, wherein the control module determines an attenuation coefficient of the signal propagation path and controls the RF radar module to adjust first signal strength based on the attenuation coefficient to remain below the regulatory limits for maximum emitted power.

6. The system of claim 5, wherein the radar reflector module is energized in response to electrical stimulation from at least one of the initial RF signals.

7. The system of claim 6, wherein at least one of the initial RF signals powers an RF identification module located remotely from the aircraft to generate a digital RF identification signal, and the control module is configured to determine a distance of the obstacle based on the digital RF identification signal received by the RF radar module.

8. A method of detecting an obstacle with respect to a vehicle, the method comprising:
   transmitting via an RF radar module an initial RF signal having a first signal strength and receiving via the RF radar module at least one retroreflected RF signal having a second signal strength based on the initial RF signal; and
   determining a second distance between the radar reflector module and at least one obstacle remotely located from the vehicle based on the second reflected signal and a third signal induced by the at least one obstacle.

9. The method of claim 8, further comprising determining a first location of the radar reflector module based on the second reflected signal, determining a second location of the at least one obstacle based on the third signal, and determining the second distance based on a comparison between the first location and the second location.

10. The method of claim 9, further comprising determining a location of a wingtip of the vehicle based on the second reflected signal, and generating an alert when a third distance between the wingtip and the at least one obstacle is below a threshold distance.

11. The method of claim 10, further comprising determining an attenuation coefficient of the signal strength of the second reflected signal and adjusting the first signal strength based on the attenuation coefficient to remain below regulatory limits of a maximum emitted power.

12. The method of claim 11, further comprising adjusting the first signal strength based on geometrical antenna gain effects.

13. The method of claim 12, further comprising generating an efficient retroreflection of the first signal strength when delivering the reflected RF signal via the radar reflector module using at least one of a passive device requiring no external power source and an active device requiring an external power source.

14. The method of claim 13, further comprising powering the radar reflector module in response to electrical stimulation from at least one of the initial RF signals.

15. The method of claim 14, further comprising energizing an RF identification module located remotely from the aircraft, receiving a digital RF identification in response to the energizing and determining a distance of the obstacle based on the digital RF identification signal.

* * * * *